(12) United States Patent
Sehgal et al.

(10) Patent No.: US 10,558,531 B2
(45) Date of Patent: Feb. 11, 2020

(54) SYSTEMS AND METHODS FOR BACKUP AND RESTORE OF MASTER-LESS DISTRIBUTED DATABASE CLUSTERS

(71) Applicant: NETPP, INC., Sunnyvale, CA (US)

(72) Inventors: Priya Sehgal, Pune (IN); Atish Kathpal, Bangalore (IN)

(73) Assignee: NETAPP, INC., Sunnyvale, CA (US)

(*) Notice: Subject to any disclaimer, the term of this patent is extended or adjusted under 35 U.S.C. 154(b) by 514 days.

(21) Appl. No.: 15/490,236

(22) Filed: Apr. 18, 2017

(65) Prior Publication Data

US 2018/0300205 A1   Oct. 18, 2018

(51) Int. Cl.
*G06F 17/30* (2006.01)
*G06F 11/14* (2006.01)
*G06F 16/11* (2019.01)
*G06F 16/16* (2019.01)

(52) U.S. Cl.
CPC ...... *G06F 11/1469* (2013.01); *G06F 11/1448* (2013.01); *G06F 11/1451* (2013.01); *G06F 11/1453* (2013.01); *G06F 11/1466* (2013.01); *G06F 16/128* (2019.01); *G06F 16/166* (2019.01); *G06F 2201/80* (2013.01); *G06F 2201/82* (2013.01); *G06F 2201/84* (2013.01)

(58) Field of Classification Search
CPC ............. G06F 11/1469; G06F 11/1448; G06F 11/1451; G06F 11/1466; G06F 11/1453; G06F 16/166; G06F 16/128; G06F 2201/80; G06F 2201/82; G06F 2201/84
See application file for complete search history.

(56) References Cited

U.S. PATENT DOCUMENTS

| | | | |
|---|---|---|---|
| 2015/0142747 A1* | 5/2015 | Zou | G06F 11/1464 707/649 |
| 2016/0057219 A1* | 2/2016 | Kore | H04L 67/28 709/248 |
| 2017/0147602 A1* | 5/2017 | Darcy | H04L 63/10 |

OTHER PUBLICATIONS

Hewitt, Eben; "Cassandra: The Definitive Guide"; Nov. 2010; O'Reilly Media, Inc.; Sebastopol, California, US.

* cited by examiner

*Primary Examiner* — Alicia M Willoughby
(74) *Attorney, Agent, or Firm* — Klein, O'Neill & Singh, LLP

(57) ABSTRACT

Methods and systems for generating a cluster consistent backup of a distributed, master-less database cluster is provided. One method includes a first phase of a backup operation where a crash consistent backup of the various LUNs used by the cluster nodes is taken. The crash consistent backup is then transformed into a cluster consistent backup during a second phase of the backup operation.

20 Claims, 14 Drawing Sheets

SYSTEMS AND METHODS FOR BACKUP AND RESTORE OF MASTER-LESS DISTRIBUTED DATABASE CLUSTERS

TECHNICAL FIELD

The present disclosure relates to backup and restore of distributed, master-less database clusters using a networked storage system.

BACKGROUND

Various forms of storage systems are used today to store data. These forms include direct attached storage (DAS) network attached storage (NAS) systems, storage area networks (SANs), and others. Network storage systems are commonly used for a variety of purposes, such as providing multiple users with access to shared data, backing up data and others.

A shared storage system typically includes at least one computing system executing a storage operating system for storing and retrieving data on behalf of one or more client computing systems ("clients"). The storage operating system stores and manages shared data containers in a set of mass storage devices.

A master-less, NoSQL database cluster uses a plurality of computing nodes to store a database including database logs, and replicas of the database at shared storage systems. Each cluster node is equal in status and stores the data and database logs for a database application. Backing up distributed databases efficiently, without quiescing database applications is challenging because of the number of computing nodes and clients that access distributed databases at any given time. Continuous efforts are being made to efficiently backup and restore databases that are stored at distributed, master-less database clusters.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

Figure 1A:
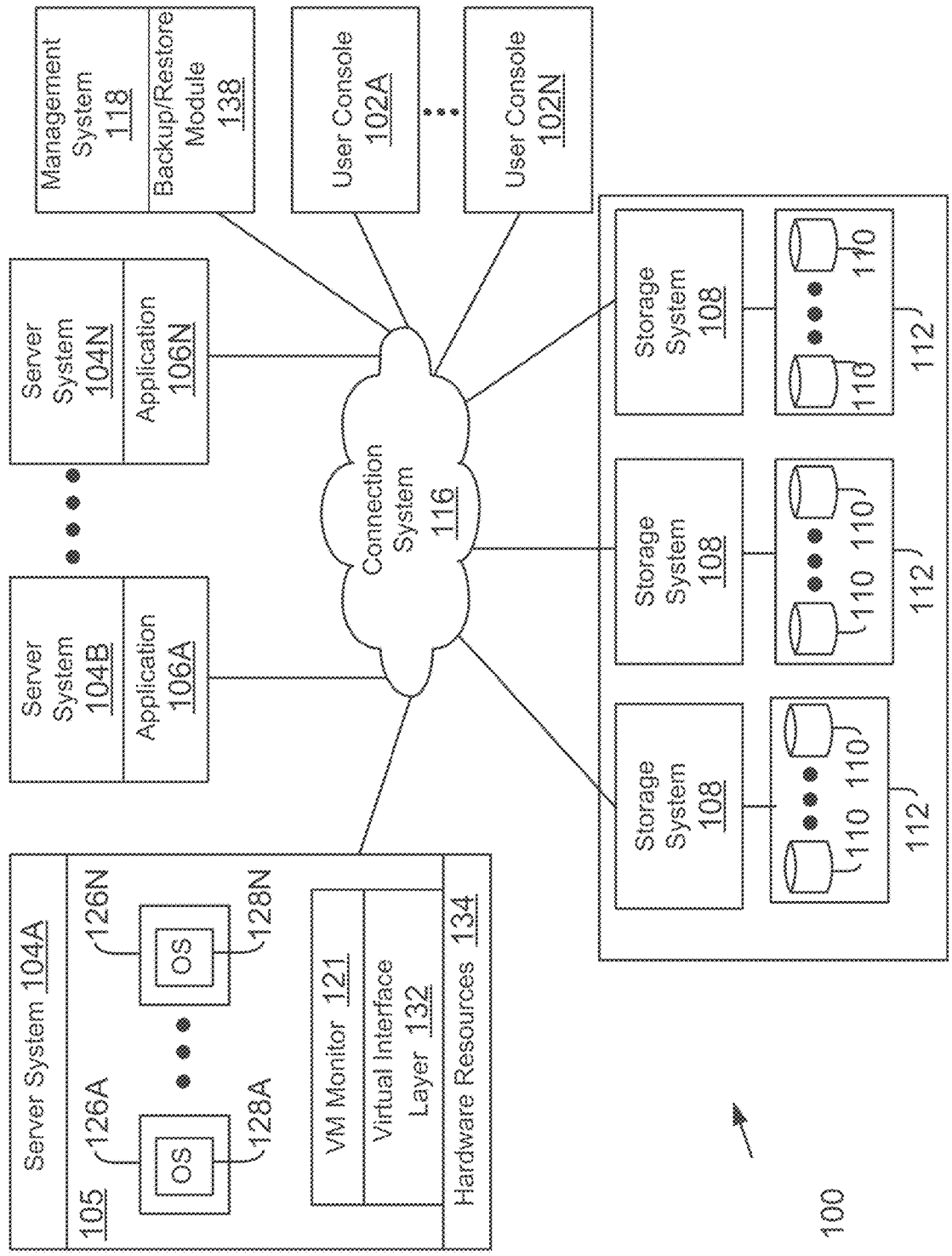
FIG. 1A shows an example of an operating environment for the various aspects disclosed herein.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

In one aspect, NoSQL databases in a master-less, distributed cluster are backed up and restored using innovative backup and restore technology of the present disclosure. A NoSQL database is different from a typical SQL (structured query language) relational database that is based on tabular relations. A NoSQL database uses different data structures than SQL databases to store and retrieve data, for example, key-value pairs.

NoSQL databases may be managed in a master-less, clustered environment where numerous computing nodes execute a database application or an instance of a database application. In a master-less architecture, each node has the same status, as described below in detail. Examples of master-less database applications include Cassandra, CockroachDB, DynamoDB and other similar database programs (without derogation of any third party trademark rights). Some of the examples below are based on using Cassandra, a NoSQL database program/application, however, the various adaptive aspects of the innovative technology described herein are not limited to any specific database type.

As an example, some of the database applications use a log-structured merge-tree (or LSM tree) data structure for providing indexed access to files. LSM trees maintain key-value pairs and data may be kept in two or more separate structures.

Typically, a database application in a master-less cluster receives a request to write information. The database application first writes the information to a commit log, and then to an in-memory (or cache) table structure that may be referred to as a "Memtable". A write request is considered successful once it is written to the commit log and the memtable. Data from the cache is periodically written at a shared storage device to a persistent table structure that may be referred to as an SSTable (sorted string table). It is noteworthy that the adaptive aspects referred to herein are not limited by the use of terms commit log, Memtable or SStable.

There are various challenges for backing up and restoring databases in a distributed NoSQL master-less cluster. Crash-consistent backups that capture an image of data at a given time are not sufficient for distributed database applications because they are not cluster consistent and may not capture all the data in a cache of a database node or any pending I/O operations.

A cluster consistent backup for a distributed database is a backup that is in a cluster consistent state. The cluster consistent state ensures data across multiple nodes meets consistency requirements that are set by a database application. For example, if the database application configures that data writes have to be replicated across 3 nodes, then a write operation is considered successful only when data is replicated by at least 2 nodes (i.e. a quorum nodes). It is difficult to provide cluster consistent backups without having the cluster nodes interface with each other to remove inconsistencies. The inter-node communication to remove inconsistencies consumes network and computing resources and hence inefficient.

It is also desirable to backup the distributed database without having to quiesce the database application. The term quiesce as used herein describes a state in which a database application cannot accept client read and write requests.

It is also difficult to ensure that a backup operation has succeeded even when some of the nodes are not available. Furthermore, one has to store backups in a space efficient manner to optimally use shared storage space and that can be challenging when database replicas are spread across multiple nodes.

Another challenge with master-less database clusters is that the database applications may use consistent hashing for distribution of data across multiple nodes, as described below. This makes it difficult for a backup operation to take a snapshot of a single node on a per-partition basis to backup data for the partition.

Yet another challenge with master-less database clusters is that conventional techniques using crash consistent backups have to perform expensive and resource intensive "repairs" to reconcile a crash consistent backup with data replicated/cached at multiple nodes. This can delay a restore operation and hence is undesirable.

In one aspect, innovative backup and restore technology is provided for a master-less, NoSQL distributed database cluster having a plurality of nodes. A crash consistent backup is efficiently transformed to a cluster consistent state without having to quiesce read/write requests from client applications or having cluster nodes communicate with each other for achieving cluster consistency. Furthermore, the cluster consistent backup is stored efficiently.

In one aspect, a backup operation is split into two phases. During the first phase, a crash-consistent backup (i.e. snapshots) taken of the logical unit numbers (LUNs) used by the plurality of nodes. The snapshots capture the data and commit logs of each node at a given time. Token information (described below) for the plurality of nodes is saved with backup metadata.

During a second phase, the snapshots from the first phase are cloned and mounted on a node. The clones have both commit logs and data files (SSTables). The data from the commit logs of the plurality of nodes is flushed to persistence in this phase, creating new versions of the data files. The clones with the new data files are mounted as read-only objects to provide a unified view of all the clones. A backup LUN is configured and mounted as a read/write LUN. Innovative compaction is then performed across the various mounted, read-only clones to remove data duplicates and resolve inconsistencies across data stored on various nodes. The compacted data is efficiently stored using the backup LUN. A snapshot of the backup LUN is taken as a full backup of the database and is made available across multiple nodes. Previous snapshots from the first phase and the clones are deleted for storage space efficiency. The innovative restore process uses the snapshot of the backup LUN for multiple nodes without having to perform resource intensive repair processes. Details regarding the innovative backup and restore technology are now provided below.

System 100:

FIG. 1A shows an example of a networked operating environment 100 (also referred to as system 100), for implementing the various adaptive aspects of the present disclosure. In one aspect, system 100 may include a plurality of computing systems 104A-104N (may also be referred to and shown as server system 104 or as host system 104) that may access one or more shared storage systems 108 via a connection system 116 such as a local area network (LAN), wide area network (WAN), the Internet and others. The server systems 104 may operate as computing nodes of a master-less database cluster and may communicate with each other via connection system 116, for example, for working collectively to provide data-access service to user consoles 102A-102N (may be referred to as user 102 or client systems 102).

Server systems 104 may be computing devices (or nodes) configured to execute applications 106A-106N (referred to as application 106 or applications 106) over a variety of operating systems, including the UNIX® and Microsoft Windows® operating systems. Applications 106 may utilize data services of storage system 108 to access, store, and manage data in a set of storage devices 110 that are described below in detail.

Application 106 may include a database program (for example, Cassandra and other similar database applications) that is executed in a master-less distributed database cluster, as described below in detail. The term database node as used herein may include a stand-alone server or a virtual machine executing an instance of the database application.

Server systems 104 generally utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

Server 104A may also execute a virtual machine environment 105, according to one aspect. In the virtual machine environment 105 a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual execution environment 105 executes a plurality of VMs 126A-126N that execute a plurality of guest OS 128A-128N (may also be referred to as guest OS 128) to share hardware resources 134. As described above, hardware resources 134 may include CPU, memory, I/O devices, storage or any other hardware resource.

A virtual machine monitor (VMM) 121, for example, a processor executed hypervisor layer provided by VMWare Inc., Hyper-V layer provided by Microsoft Corporation (without derogation of any third party trademark rights) or any other layer type, presents and manages the plurality of guest OS 128A-128N. VMM 121 may include or interface with a virtualization layer (VIL) 132 that provides one or more virtualized hardware resource 134 to each guest OS. For example, VIL 132 presents physical storage at storage devices 110 as virtual storage (for example, as a virtual hard drive (VHD)) to VMs 126A-126N. The VMs use the VHDs to store information at storage devices 110.

In one aspect, VMM 121 is executed by server system 104A with VMs 126A-126N. In another aspect, VMM 121 may be executed by an independent stand-alone computing system, often referred to as a hypervisor server or VMM server and VMs 126A-126N are presented via another computing system. It is noteworthy that various vendors provide virtualization environments, for example, VMware Corporation, Microsoft Corporation (without derogation of any third party trademark rights) and others. The generic virtualization environment described above with respect to FIG. 1A may be customized depending on the virtual environment provider.

System 100 may also include a management system 118 for managing and configuring various elements of system 100. Management system 118 may include one or more computing systems for performing various tasks described below in detail. Management system 118 may also execute or include a backup/restore module 138 (for brevity referred to as backup module 138) that executes the various process blocks of the innovative backup technology described below in detail.

In one aspect, storage system 108 is a shared storage system having access to a set of mass storage devices 110 (may be referred to as storage devices 110) within a storage subsystem 112. As an example, storage devices 110 may be a part of a storage array within the storage sub-system 112. Storage devices 110 are used by the storage system 108 for storing information. The storage devices 110 may include writable storage device media such as magnetic disks, video tape, optical, DVD, magnetic tape, non-volatile memory devices for example, self-encrypting drives, flash memory devices and any other similar media adapted to store information. The storage devices 110 may be organized as one or more groups of Redundant Array of Independent (or Inexpensive) Disks (RAID). The various aspects disclosed herein are not limited to any particular storage device or storage device configuration.

In one aspect, to facilitate access to storage devices 110, a storage operating system of storage system 108 "virtualizes" the storage space provided by storage devices 110. The storage system 108 can present or export data stored at storage devices 110 to server systems 104 and VMM 121 as a storage volume or one or more qtree sub-volume units including LUNs. Each storage volume (or LUN) may be configured to store data files (or data containers or data objects), scripts, word processing documents, executable programs, and any other type of structured or unstructured data. From the perspective of the VMS/server systems, each volume can appear to be a single disk drive. However, each volume can represent the storage space in one disk, an aggregate of some or all of the storage space in multiple disks, a RAID group, or any other suitable set of storage space.

It is noteworthy that the term "disk" as used herein is intended to mean any storage device/space and not to limit the adaptive aspects to any particular type of storage device, for example, hard disks.

The storage system 108 may be used to store and manage information at storage devices 110 based on a request generated by server system 104, management system 118, user 102 and/or a VM. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 (or VMs 126A-126N) transmits one or more input/output (I/O) commands, such as an NFS or CIFS request, over connection system 116 to the storage system 108. Storage system 108 receives the request, issues one or more I/O commands to storage devices 110 to read or write the data on behalf of the server system 104, and issues an NFS or CIFS response containing the requested data over the connection system 116 to the respective server system 104

In one aspect, storage system 108 may also have a distributed architecture, for example, a cluster based architecture that may include a separate network module and storage module, described below in detail with respect to FIG. 2A.

Figure 1B:
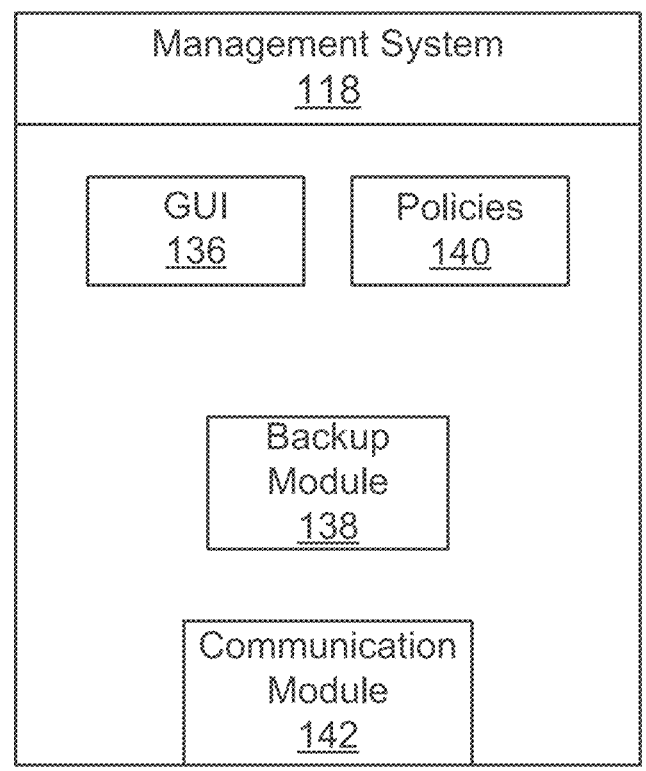
FIG. 1B shows a block diagram of a management system with a backup module of the present disclosure.

Management System 118:

FIG. 1B shows a block diagram of management system 118 with the backup module 138, according to one aspect of the present disclosure. The various modules of management system 118 may be implemented in one computing system or in a distributed environment among multiple computing systems. For example, the backup module 138 may be executed by a standalone server and/or VM.

In the illustrated aspect, the management system 118 may include a graphical user interface (GUI) module 136 to generate a GUI for use by a user. In another aspect, management system 118 may present a command line interface (CLI) to a user. The GUI may be used to receive requests to setup backup policies 140 based on which, the backup module 138 executes backup and/or restore operations.

Management system 118 may also include a communication module 142 that implements one or more conventional network communication protocols and/or APIs to enable the various modules of management system 118 to communicate with the various computing nodes of a database cluster 130, storage system 108, VMs 126A-126N, server system 104 and clients 102.

Management system 118 may also include other modules that are not described in detail because the details may not be germane to the inventive aspects disclosed herein.

Figure 1C:
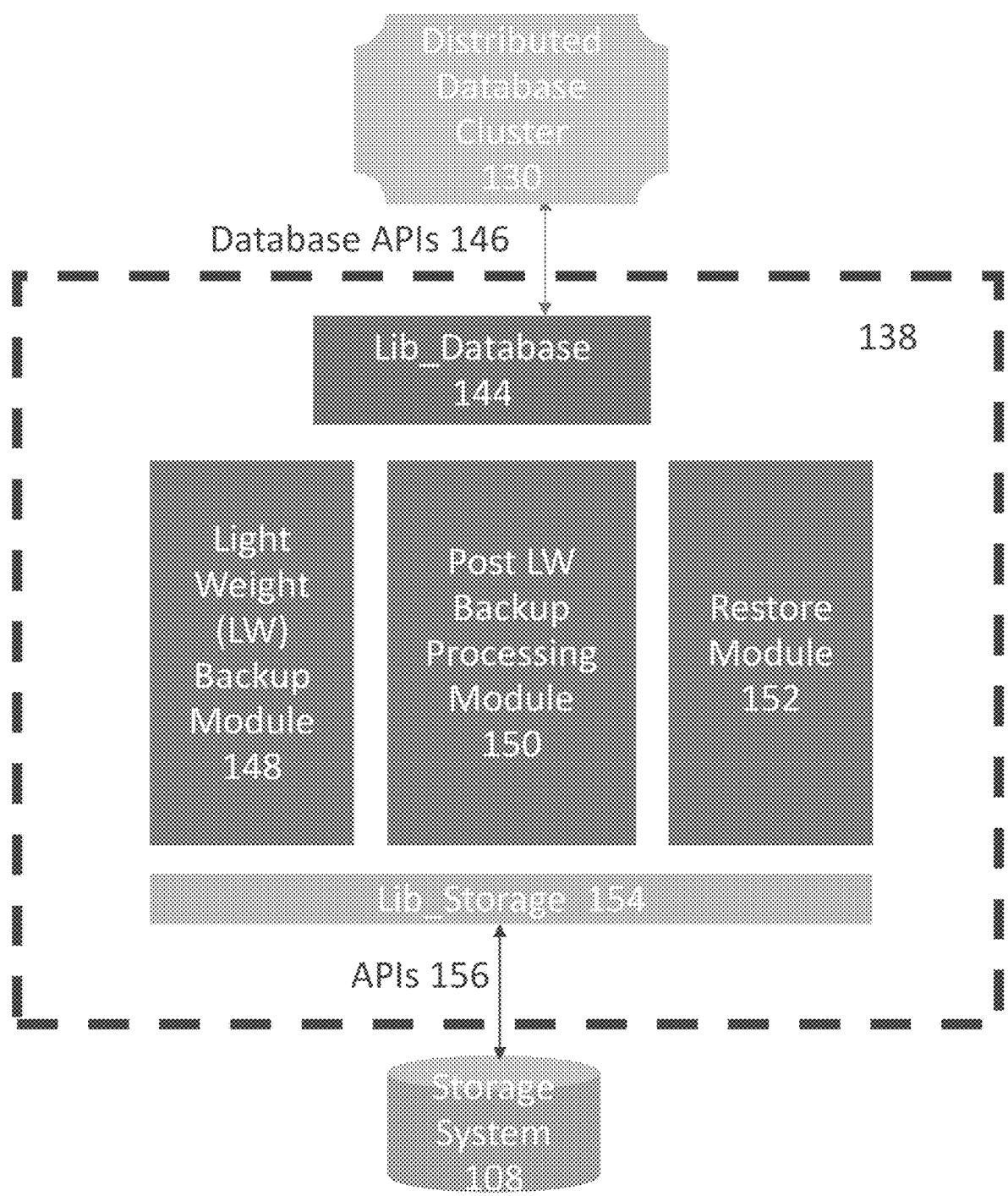
FIG. 1C is a block diagram of the backup module, according to one aspect of the present disclosure.

Backup Module 138:

FIG. 1C provides an example of the backup module 138, according to one aspect of the present disclosure. In one aspect, the backup module 138 includes a light weight (LW) backup module 148 (for brevity, may be referred to as module 148), a post LW backup processing module 150 (for brevity, may be referred to as module 150) and a restore module 152. Module 148 executes Phase 1 of a backup operation described below in detail with respect to FIGS. 1F and 1G. Module 150 executes Phase 2 of the backup operation or a portion thereof, as described below in detail with respect to FIGS. 1H-1K. The restore module 152 executes a restore process described below in detail with respect to FIG. 1L.

The various modules communicate with a master-less database cluster 130 (for brevity, may also be referred to simply as cluster 130) via database application program interfaces (APIs) 146 provided by database libraries 144 (shown as Lib_Database 144). The structure/schema of database APIs 146 depends on the type of database. For example, Cassandra database program will use one set of APIs, while CockroachDB program may use another set of APIs that are stored at Lib_Database 144. The adaptive aspects of the present disclosure are not limited to any specific API type or format.

A storage library 154 (shown as Lib_Storage 154) stores APIs 156 that are used to communicate with the storage system 108. APIs 156 will also depend on the storage system type. For example, Zephyr APIs (ZAPIs) may be used for a cluster based storage system provided by NetApp Inc. (without derogation of any trademark rights). REST based APIs may be used for cloud based storage systems (e.g. SolidFire provided by NetApp Inc. (without derogation of any trademark rights)). REST means "Representational State Transfer", which is a scalable system used for building web services. REST based systems/interface may use HTTP (hyper-text transfer protocol) or other communication protocols for communication. The various aspects disclosed herein are not limited to any specific API format for communicating with storage systems.

Figure 1D:
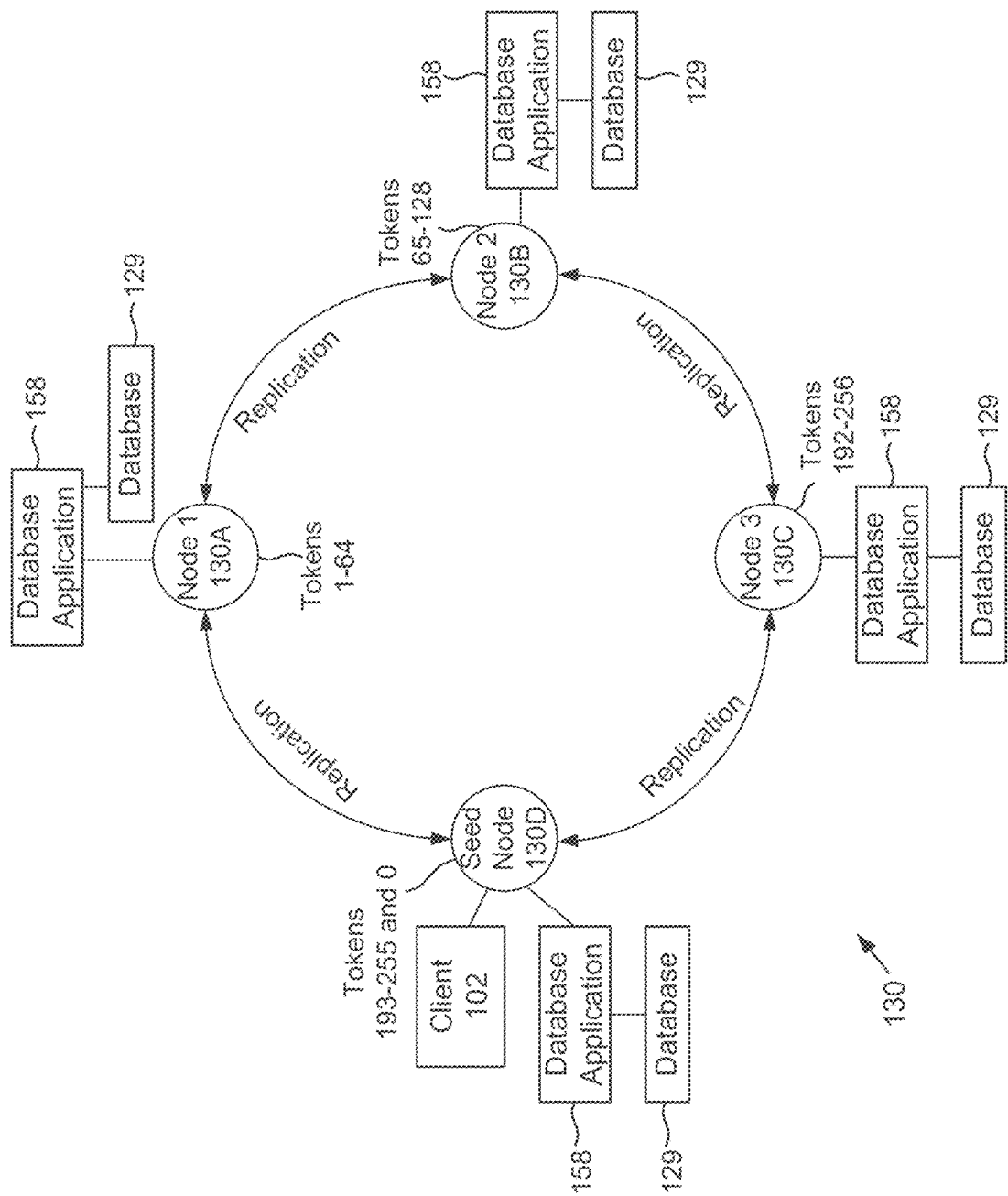
FIG. 1D shows an example of a master-less, database cluster, used according to one aspect of the present disclosure.

Cluster 130:

FIG. 1D shows an example of cluster 130 as a ring, where cluster 130 includes computing nodes 130A-130D (may also be referred to as nodes 130A-130D) that are similar to servers 104. Cluster 130 may be referred to as a production cluster, when the cluster is used by clients to save data in a database.

Each node executes an instance of a database application 158 (similar to application 106, FIG. 1A) to store data in a database 129, on behalf of client systems 102. As an example, database application 158 may be the Cassandra database application. However, the adaptive aspects are not limited to the Cassandra database application and instead the database application is being used as an example to illustrate the various aspects of the innovative backup and restore technology of the present disclosure.

In one aspect, the nodes within cluster 130 communicate using a peer-to-peer protocol to exchange state information. The cluster 130 also includes at least one seed node (e.g. 130D) that are used to discover participating nodes. A seed list is maintained by all the nodes to obtain information regarding other nodes.

In one aspect, in cluster 130, single logical database 129 is spread evenly amongst all the participating nodes 130A-130D. Data stored at one node replicated at one or more nodes. Each node stores data in partitions, where each row is identified by a partition key or a row key. A consistent hashing algorithm maps row keys to cluster nodes.

At start up, each node 130A-130D, is assigned a token range which determines its position in the cluster 130 and the range of data stored by the node. Each node receives a proportionate range of the token ranges to ensure that data is spread evenly across the ring. As shown in FIG. 1D, a 0 to 255 token range is distributed evenly amongst the four nodes of cluster 130. Each node is responsible for a certain set of data which determined by a hash function for computing a resultant token for a particular row key. Each time a node within cluster 130 receives a request to store data it consistently hashes the data, for example, using the MD5 or any other algorithm to determine a "token" value. For example, the token range for data may be $0-2^{127}$.

Figure 1E:
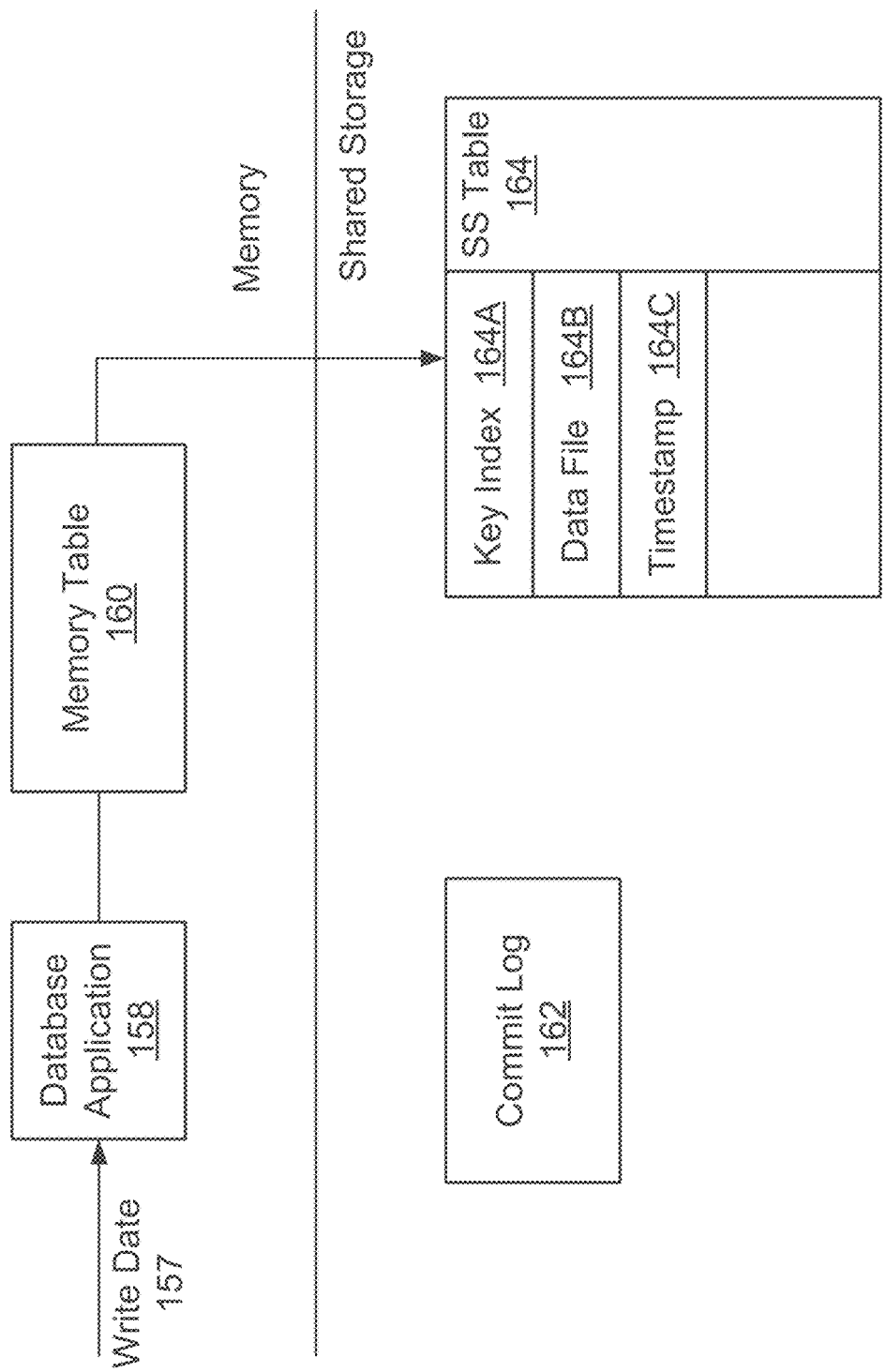
FIG. 1E shows an example of how data is written to a database in a master-less database cluster.

FIG. 1E shows an example of how data 157 is written by nodes 130A-130D in a cluster. When write data 157 is received by the database application 158, the data is first written to a commit log 162 and then to a memory table 160 at a cache of a database node. When the memory table 160 is full or after a certain duration, the information from the memory table 160 is flushed to a data file, shown as SSTable 164. The SStable 164 stores a key index 164A, a data file 164B and a time stamp 164C. Overtime, a number of SSTables 164 are created. The write data 157 is also replicated based on a replication factor i.e. a replication factor of 1 indicates that the write data 157 is replicated once.

Figure 1F:
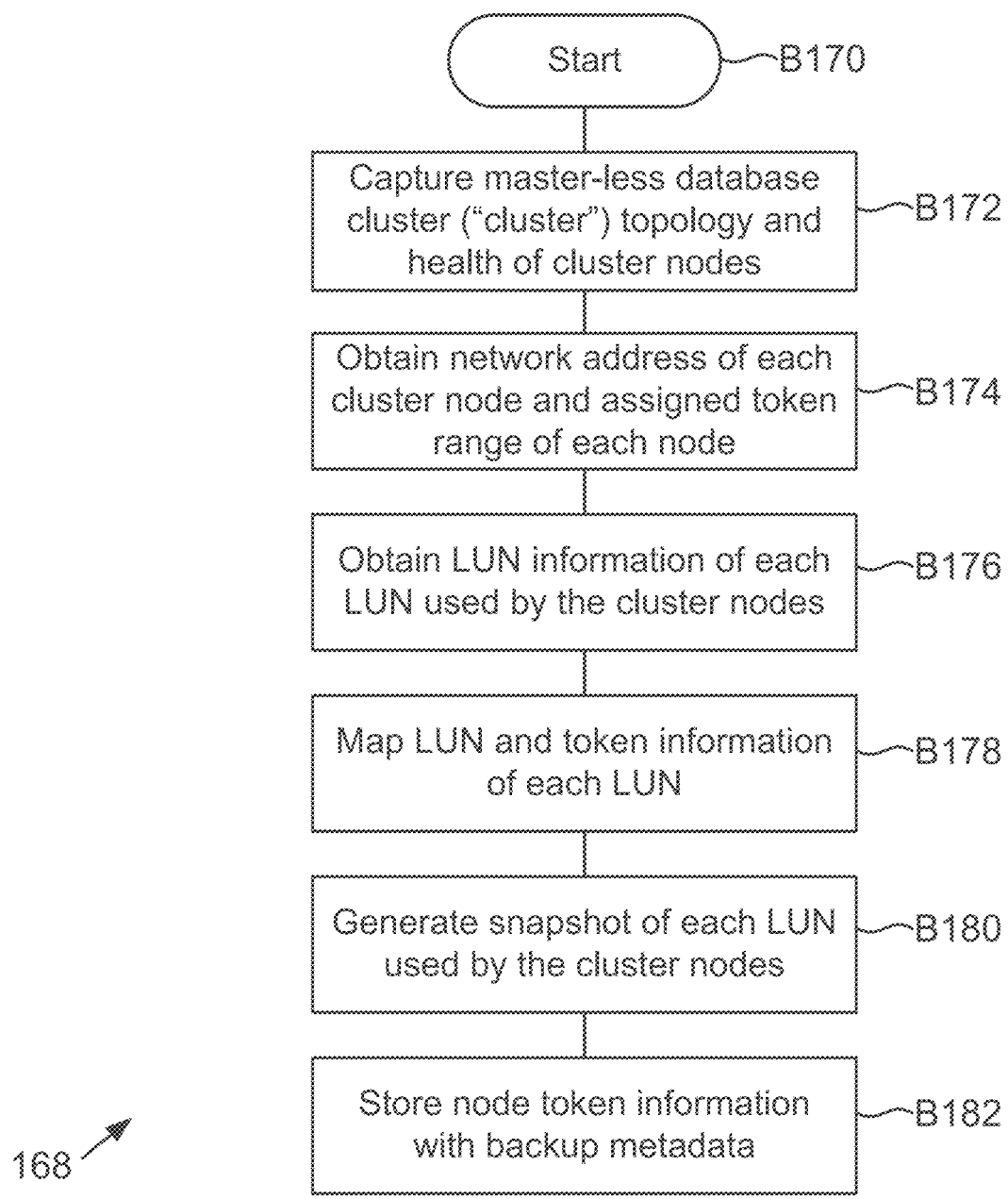
FIG. 1F shows a process flow for Phase 1 of a backup operation, according to one aspect of the present disclosure.
Figure 1G:
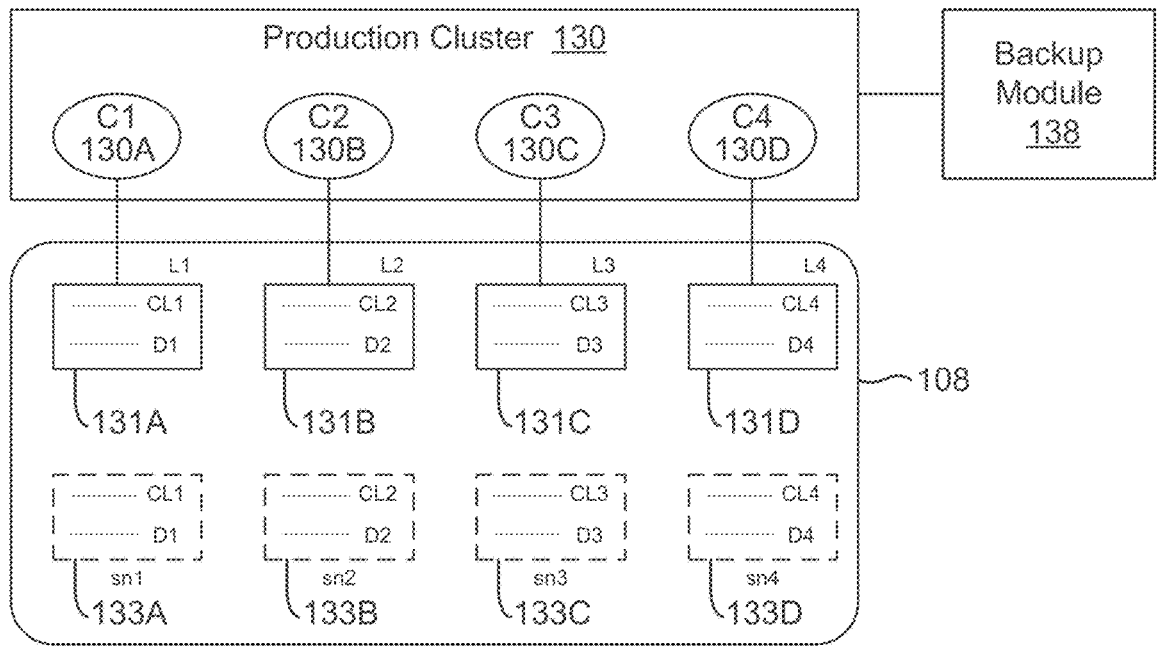
FIG. 1G shows an example of executing Phase 1 of the backup operation, according to one aspect of the present disclosure.
Figure 1I:
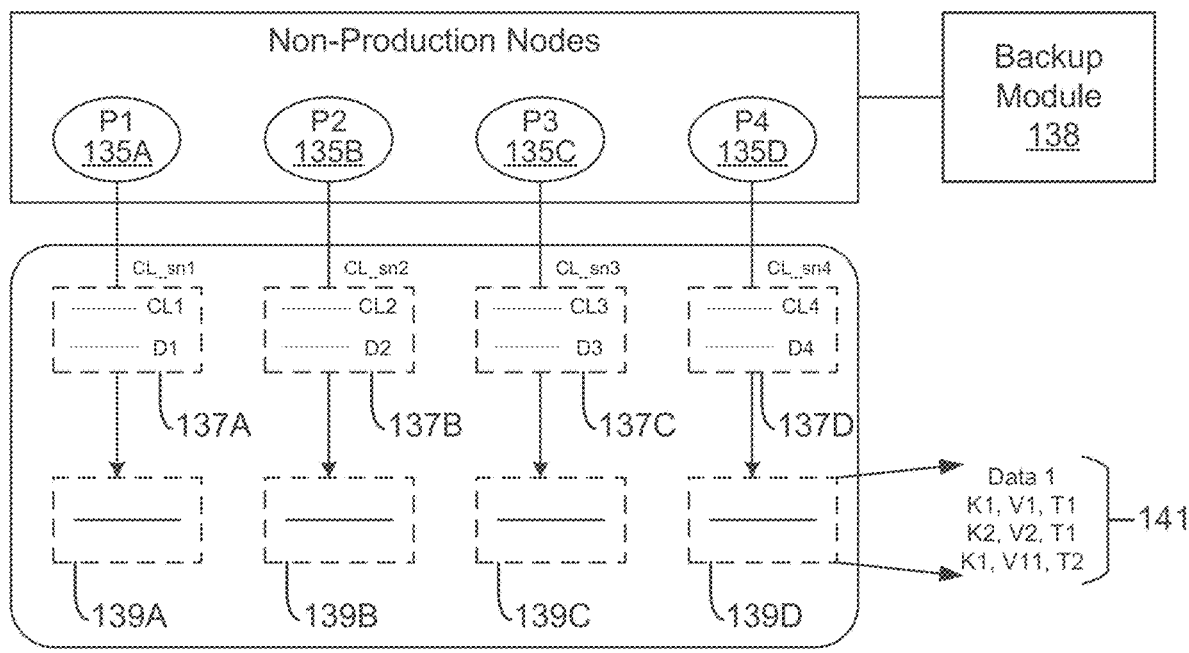
FIG. 1I shows an example of executing Phase 2, Part 1 of the backup operation, according to one aspect of the present disclosure.

Phase 1 of the Backup Process:

FIG. 1F shows a process 168 for executing Phase 1 of a backup operation using the innovative backup technology, according to one aspect of the present disclosure. FIG. 1G provides an illustration of process 168.

Process 168 begins in block B170 when cluster 130 is active and operational. Database application 158 is also operational and has data stored by one or more nodes 130A-130D using LUNs 131A-131D (FIG. 1G).

In block B172, the cluster topology and the health of each cluster node is obtained by module 148 using one or more APIs 146. This information may be obtained by sending a request to one or more nodes 130A-130D.

In block B174, the assigned tokens and a network address (e.g., IP address) of each healthy and active node is obtained by module 148. In one aspect, this information may be obtained from any of the cluster nodes.

In block B176, module 148 queries each node using the IP address to obtain information regarding the LUN that is being used by the node. For example, as shown in FIG. 1G, node 130A uses LUN 131A, node 130B uses LUN 131B, node 130C uses LUN 131C and node 130D uses LUN 131D. Each LUN is used to store data files (shown as D1-D4) and commit logs (shown as CL1-CL4). The LUN information includes a LUN identifier and LUN attributes, e.g., LUN size, LUN type (i.e., read, write or read/write), LUN permissions or any other information.

In block B178, module 148 of the backup module 138 maps the LUN information with the node token range. This information may be stored at a storage location by the backup module 138.

In block B180, module 148 takes snapshots of LUNs associated with healthy nodes for generating crash consistent backups of the LUNs. For example, if all nodes 130A-130D are healthy and active, then the snapshots are taken for all the LUNs 131A-131D, respectively. An example of the snapshots of each LUN are shown in FIG. 1G as 133A-133D. A snapshot is a "point in time" copy of the active file system that uses the storage LUNs for storing data on behalf of the database nodes. The snapshot is a persistent point in time (PPT) image that enables quick recovery of data.

In block B182, token information of the nodes is stored with the metadata of the snapshots by module 148. This information is used in Phase 2 of the backup process described below. The snapshot metadata is stored with the snapshots at a storage location so that it is accessible to module 150 and the restore module 152, as described below. The metadata includes a backup identifier, for example, a backup name, a database cluster 130 name, an identifier that identifies the cluster nodes 130A-130D, a health indicator indicating the health of the nodes at the time of the backup, LUN identifier identifying the LUN used by the node, snapshot identifier identifying the snapshot of each LUN, or any other information. Thereafter, the process moves to Phase 2 of the backup operation that is executed by module 150.

Figure 1H:
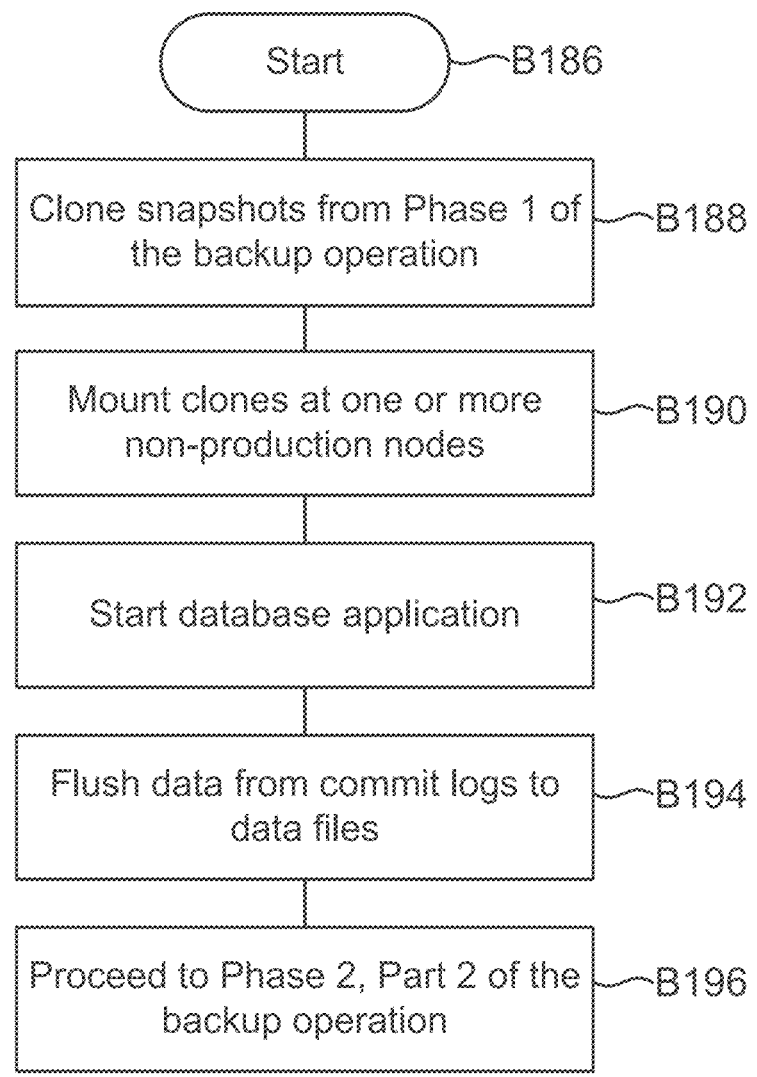
FIG. 1H shows a process flow for Phase 2, Part 1 of the backup operation, according to one aspect of the present disclosure.

Phase 2, Part 1:

FIG. 1H shows a flow diagram 184 for Phase 2, Part 1 of the backup process, according to one aspect of the present disclosure. Phase 2, Part 1 is a background phase that begins in block B186. The process is executed at non-production database nodes shown as 135A-135D in FIG. 1I. Since the database application 158 was not quiesced, the commit logs of the various nodes have to be reconciled after the crash consistent backup of Phase 1.

In block B188, the snapshots from Phase 1 are cloned by module 150, shown as 137A-137D with commit logs CL1-CL4. The snapshot clones typically share data blocks with the snapshot copies of a virtual block number (vbn) space maintained by a storage operating system to store the information. A data block in the vbn is typically mapped to a storage device block number in a storage device block number (dbn) space for storing information.

In block B190, the clones 137A-137D are mounted at one or more production nodes 135A-135D. The database application 158 is then started in block B192. Thereafter, in block B194, the data from the commit logs is flushed to data files (e.g. SSTables (e.g., 164, FIG. 1E) shown as 139A-139D in FIG. 1I. An example of a data file is shown as 141 with key value pairs and a time stamp, for example, K1, V1, T1, where K1 is a key, V1 is a value and T1 is a timestamp. The token information captured in Phase 1 is also copied. A configuration file for each non-production node is updated, for example, a listen_address and a seed_address, token information captured in Phase 1 or any other information.

In block B196, database application 158 is stopped and the LUNs are unmounted. The process then moves to Phase 2, Part 2 of the backup operation.

Figure 1J:
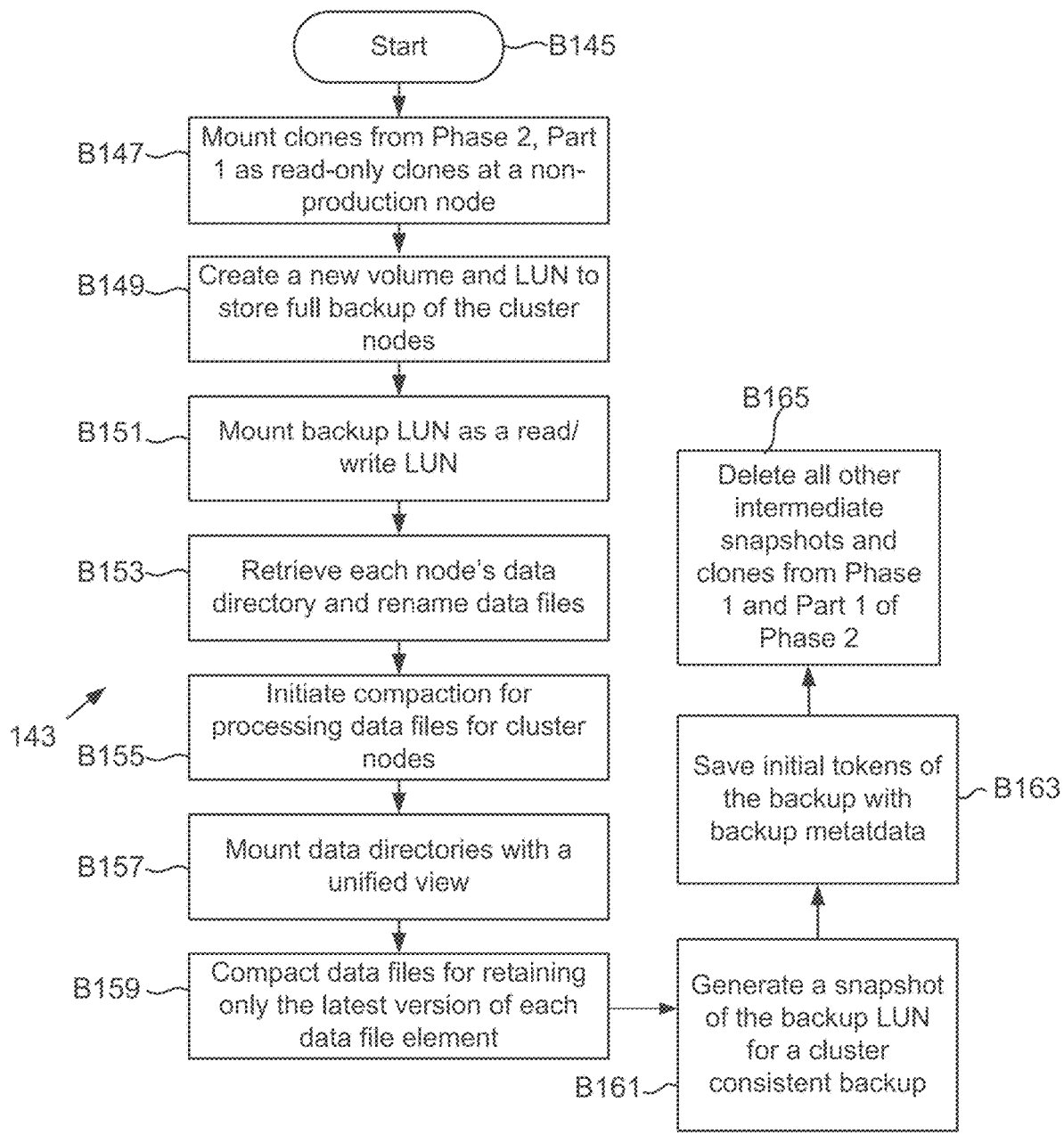
FIG. 1J shows a process flow for Phase 2, Part 2 of the backup operation, according to one aspect of the present disclosure.

Phase 2, Part 2:

FIG. 1J shows a flow diagram 143 for Phase 2, Part 2 of the backup operation to generate a cluster consistent and space efficient backup for the distributed, master-less database, according to one aspect of the present disclosure. The process blocks of FIG. 1J are described with respect to the example of FIG. 1K and executed by module 150 and database application 158.

The process begins in block B145 at one of the non-production database nodes. The token information for all the nodes from Phase 1 is copied in a configuration file.

Figure 1K:
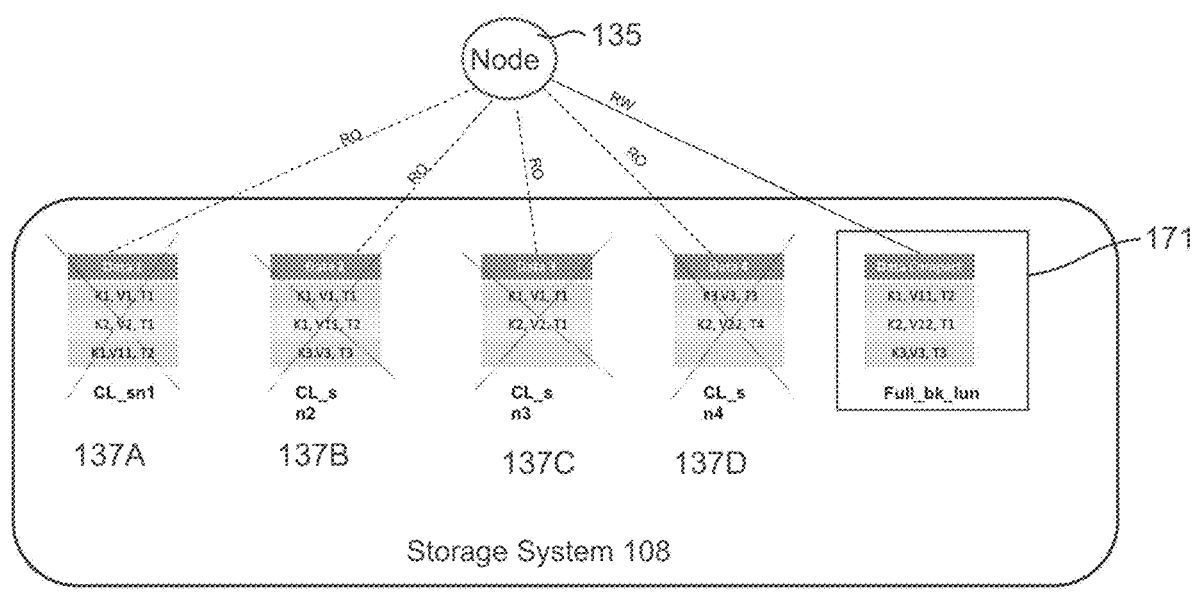
FIG. 1K shows an example of executing Phase 2, Part 2 of the backup operation, according to one aspect of the present disclosure.

In block B147, all the clones from Phase 2, Part 1 are mounted. This is shown in FIG. 1K, where at node 135, clones 137A-137D are mounted as read-only clones. In block B149, a new volume and a new LUN is created for storing a full, cluster consistent backup. The backup LUN is shown as 171 in FIG. 1K. The backup LUN is mounted as a read/write LUN in block B151.

In block B153, data from all the production nodes 135A-135D (FIG. 1I) is retrieved. For example, each node's data directory, and key-space is retrieved. The SStables 164 are renamed such that SStable generation number is not the same across all data directories. Thereafter, in block B155, compaction is initiated to delete duplicate version of data files and resolve inconsistency (or to get cluster consistent backup). The compaction functionality may be built into the database application 158 or implemented in the backup module 138.

In block B157, the data directories of all the nodes are mounted with a unified view. In one aspect, this is enabled by using a file system, for example, the UnionFS file system. The adaptive aspects of the disclosure are of course not limited to using UnionFS.

In block B159, the latest version of the data files is retained for the backup LUN. In one aspect, the timestamp for each row is used to compact the data files. This is shown within LUN 171 of FIG. 1K.

In block B161, a snapshot of the backup LUN 171 is created. The initial tokens for all the production nodes is stored with the snapshot metadata in block B163. All the previous snapshots/clones are deleted in block B165, for example, 137A-137D, as shown in FIG. 1K. Thus, a cluster consistent and space efficient backup is generated for the master-less, distributed database cluster.

Figure 1L:
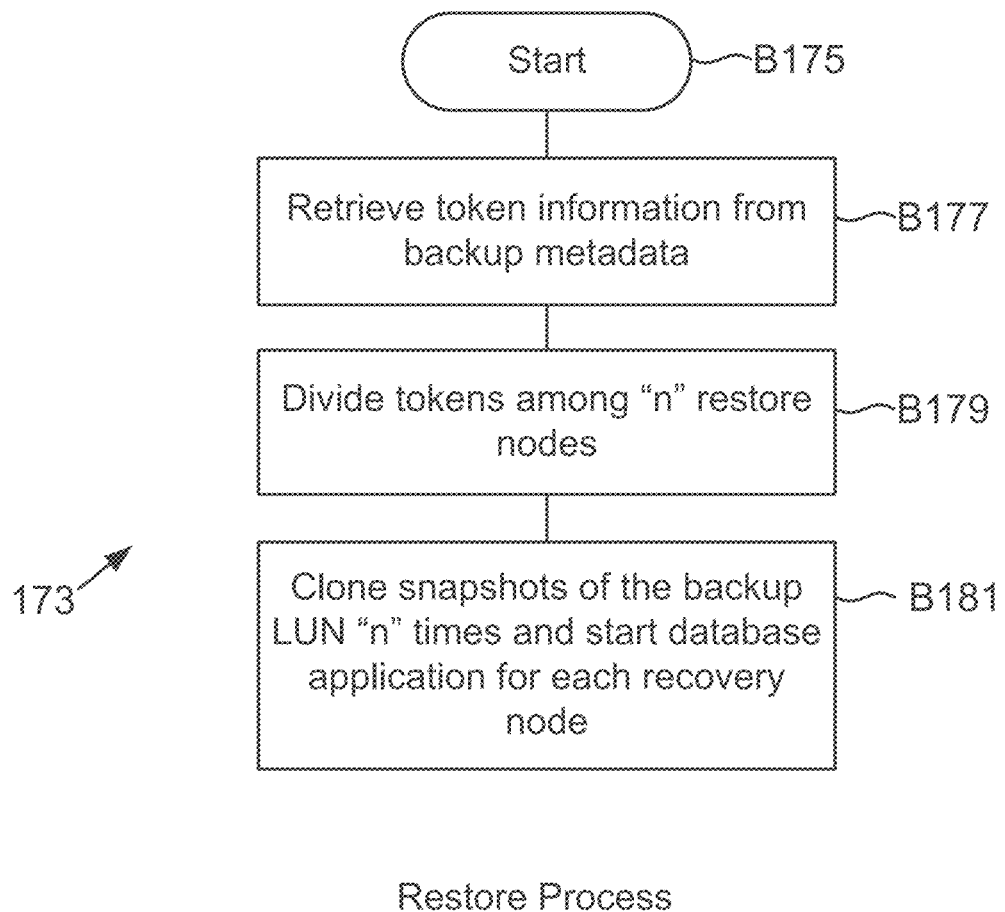
FIG. 1L shows an example of a restore process, according to one aspect of the present disclosure.

Restore Process Flow:

FIG. 1L shows a process 173 for executing a restore process from the snapshot of LUN 171, according to one aspect of the present disclosure. The cluster topology for the restored database may be different from the production cluster. The process begins in block B175. The database application 158 is installed at a restore or recovery node. The tokens from the snapshot metadata are retrieved in block B177 by restore module 152. The tokens are disturbed equally between a number of "n" restore nodes. It is noteworthy that the restore topology and the production topology may be different i.e. have different number of nodes. In block B181, the snapshot of the backup LUN 171 is cloned "n" times for the "n" number of restore nodes. The database application 158 is then initialized at each recovery node.

The innovative backup and restore technology described herein creates a cluster consistent backup of a distributed, master-less database without quiescing the database application or using cluster node communication for removing inconsistencies. The backup is stored efficiently because intermediate snapshots and clones are all deleted. The restore process is efficient because cloning a backup LUN is faster than copying data for numerous nodes and the resource intensive repairs are not needed. Furthermore, the restore process may be executed for a testing cluster that may have a different topology than the production cluster.

In one aspect, methods and systems for backup and restore of a distributed, master-less database cluster having a plurality of nodes each executing a database application and storing at least a portion of a database for the cluster are provided. One method includes capturing a topology of the distributed, master-less database cluster prior to a first phase of a backup operation; associating token information of each node with a logical storage object of a shared storage system that stores data of the database for each node on behalf of the database application; generating a snapshot of all logical storage objects associated with each of the plurality of nodes; storing token information of each node with backup metadata for the snapshot of all the logical storage objects, where the token information determines what data is stored by each node for the database; initiating a second phase of the backup operation at a recovery node using the backup metadata from the first phase of the backup operation; cloning snapshots of all the logical storage objects from the first phase of the backup operation; flushing information from a commit log for each node to data containers of the database; and creating a new backup logical storage object as a read and write object for storing a cluster consistent backup of the database; and mounting clones of the snapshots of all the logical storage objects from the first phase of the backup operation as read only objects.

The method further includes: retrieving each node's data directory and renaming data files maintained by each node for storing a portion of the database; executing compaction of the data files for the plurality of nodes by eliminating duplicate data for portions of the database; generating a snapshot of the backup logical storage object after compaction; storing token information for the plurality of nodes; deleting clones of the snapshot of the logical storage objects and snapshots of the logical storage objects from the first phase; and using the snapshot of the backup logical storage object to restore the database at a target cluster with a topology different from a topology of the distributed, master-less database cluster or similar to the topology of the distributed, master-less, database cluster.

Figure 2A:
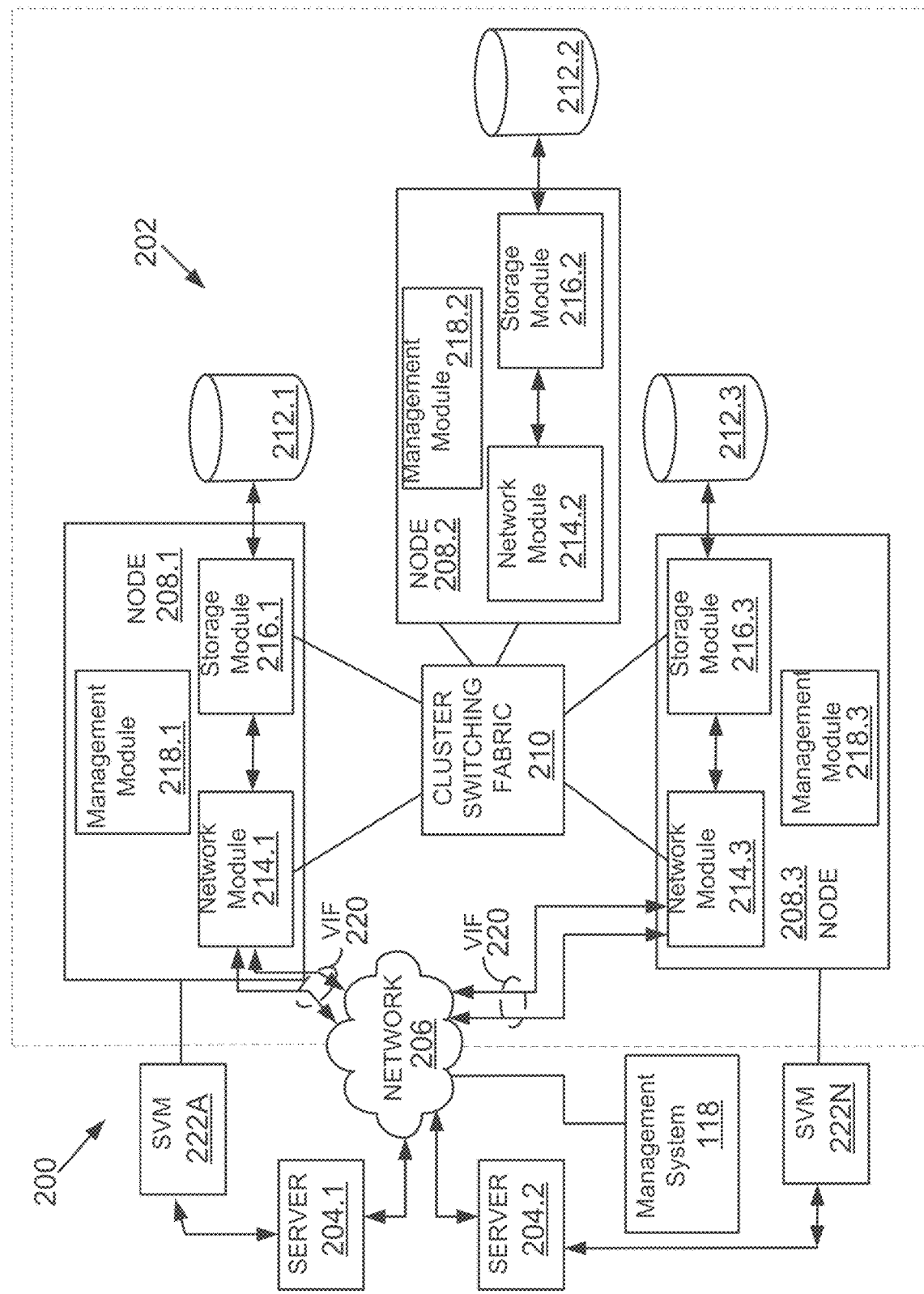
FIG. 2A shows an example of a clustered storage system, according to one aspect of the present disclosure.

Clustered Storage System:

FIG. 2A depicts an illustrative aspect of a shared storage environment 200 that is used by a distributed database cluster to store data. The storage environment 200 includes a plurality of server systems 204.1-204.2 (similar to server systems 104), a clustered storage system 202 and at least one computer network 206 communicably connecting the server systems 204.1-204.2 and the clustered storage system 202.

The clustered storage system 202 includes a plurality of nodes 208.1-208.3, a cluster switching fabric 210, and a plurality of mass storage devices 212.1-212.3 (similar to 110, FIG. 1A). Each of the plurality of nodes 208.1-208.3 is configured to include a network module, a storage module, and a management module, each of which can be implemented as a separate processor executable or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3. It is noteworthy that the storage system 202 nodes are different and separate from the distributed database cluster nodes described above.

The network modules 214.1-214.3 include functionality that enables the respective nodes 208.1-208.3 to connect to one or more of the client systems 204.1-204.2 over the computer network 206, while the storage modules 216.1-216.3 connect to one or more of the storage devices 212.1-212.3.

The management modules 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network modules 214.1, 214.3 for clarity of illustration.

The clustered storage system 202 can be organized into any suitable number of virtual servers (VServer or storage virtual machines (SVM)) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a SVM is an instance of an application service provided to a client system. The nodes 208.1-208.3 are interconnected by the switching fabric 210, which, for example, may be embodied as a Gigabit Ethernet switch or any other switch type.

Although FIG. 2A depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

The server systems 204.1-204.2 of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address. The server request typically includes a file handle for a data file stored in a specified volume on at storage 212.1-212.3.

Figure 2B:
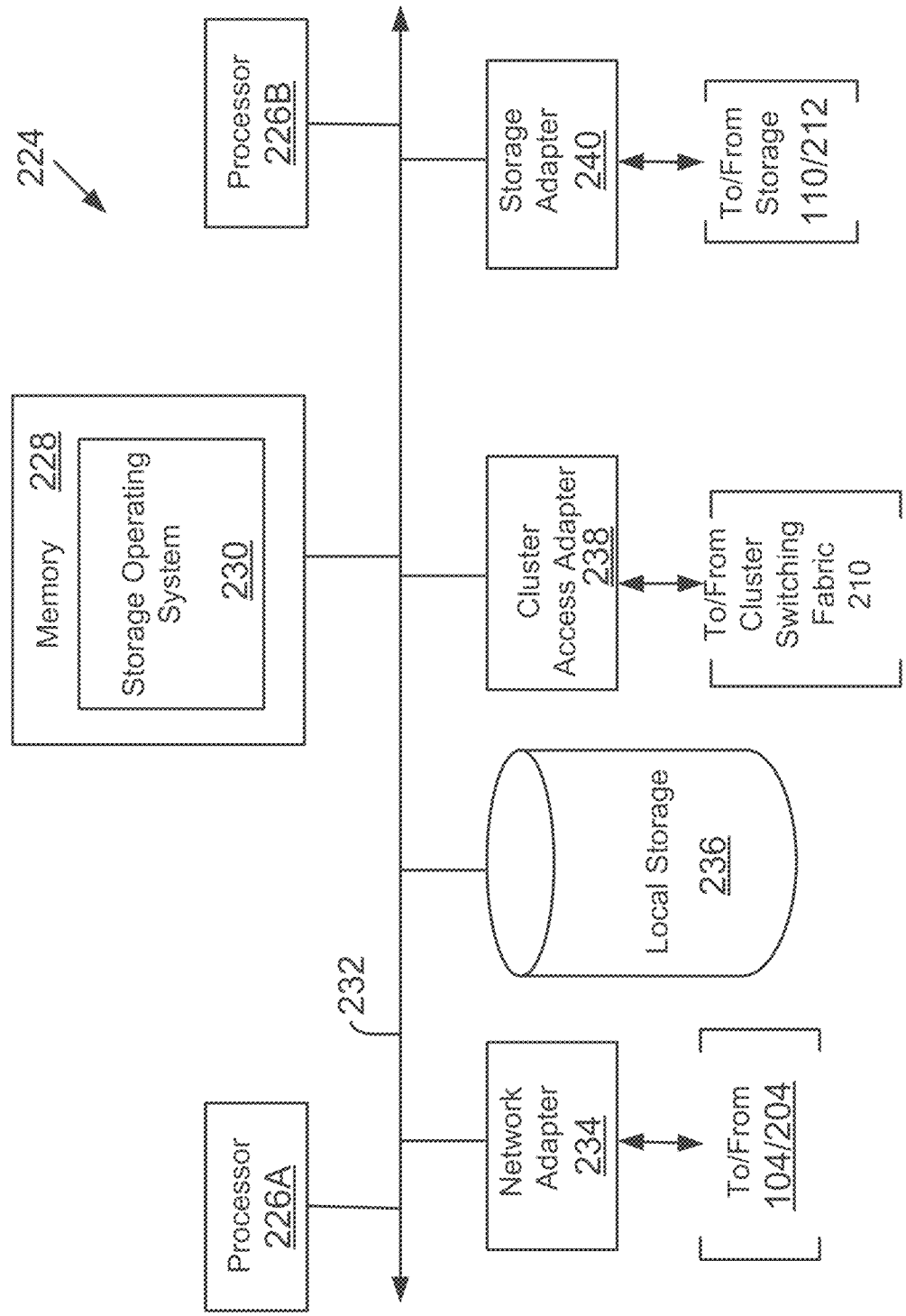
FIG. 2B shows an example of a storage system node, used according to one aspect of the present disclosure.

Storage System Node:

FIG. 2B is a block diagram of a computing system 224, according to one aspect. System 224 may be used by a stand-alone storage system 108 and/or a storage system node operating within a cluster based storage system described above with respect to FIG. 2A.

System 224 may include a plurality of processors 226A and 226B, a memory 228, a network adapter 234, a cluster access adapter 238 (used for a cluster environment), a storage adapter 240 and local storage 236 interconnected by a system bus 232. The local storage 236 comprises one or more storage devices, such as disks, utilized by the processors to locally store configuration and other information, including performance data that is provided to the management system 118.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 that preferably implements a high-level module, such as a file system, to logically organize information as a hierarchical structure of named directories, files and special types of files called virtual disks (hereinafter generally "blocks") on storage devices 110/212. However, it will be apparent to those of ordinary skill in the art that the system 224 may alternatively comprise a single or more than two processor systems. Illustratively, one processor 226 executes the functions of a network module on a node, while the other processor 226B executes the functions of a storage module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein.

The storage operating system 230, portions of which is typically resident in memory and executed by the processing elements, functionally organizes the system 224 by, inter alia, invoking storage operations in support of the storage service provided by storage system 108. An example of operating system 230 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems over point-to-point links, wide area networks, virtual private networks implemented over a public network (Internet) or a shared local area network. The network adapter 234 thus may comprise the mechanical, electrical and signaling circuitry needed to connect storage system 108 to the network. Illustratively, the computer network may be embodied as an Ethernet network or a FC network.

The storage adapter 240 cooperates with the storage operating system 230 executing on the system 224 to access information requested by the server systems 104 and management system 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 240 comprises a plurality of ports having input/output (I/O) interface circuitry that couples to the disks over an I/O interconnect arrangement, such as a conventional high-performance, FC link topology.

In another aspect, instead of using a separate network and storage adapter, a converged adapter is used to process both network and storage traffic.

Figure 3:
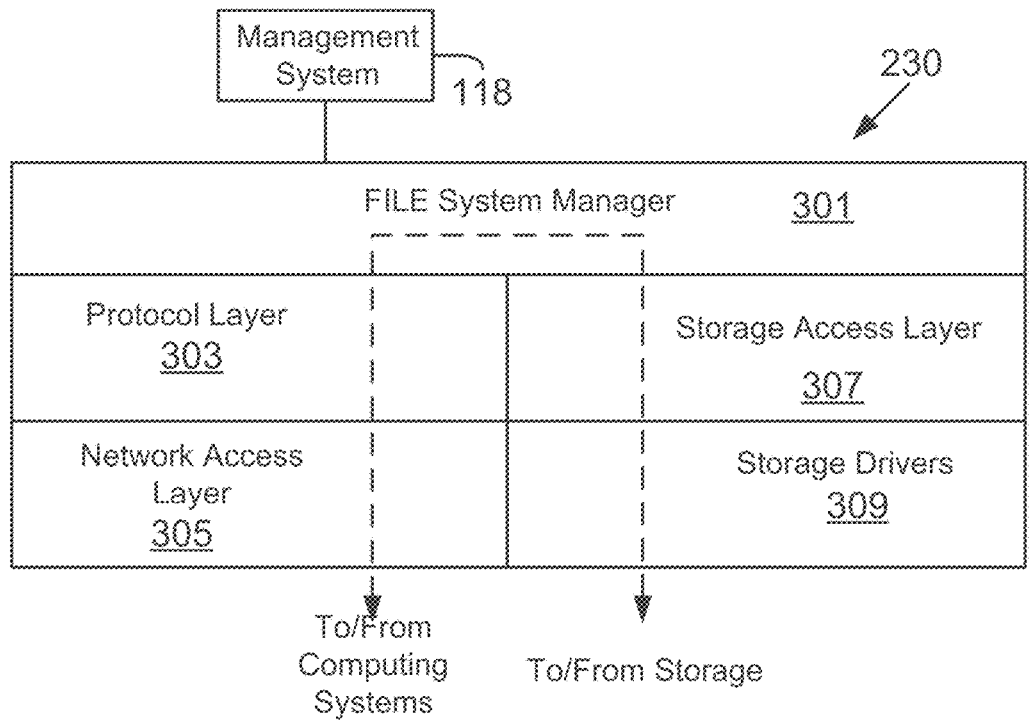
FIG. 3 shows an example of a storage operating system, used according to one aspect of the present disclosure.

Operating System:

FIG. 3 illustrates a generic example of operating system 230 executed by storage system 108, according to one aspect of the present disclosure. Storage operating system 230 interfaces with the management system 118 for backing up and cloning LUNs, described above in detail.

As an example, operating system 230 may include several modules, or "layers". These layers include a file system manager 303 that keeps track of a directory structure (hierarchy) of the data stored in storage devices and manages read/write operations, i.e. executes read/write operations on disks in response to server system 104 requests.

Operating system 230 may also include a protocol layer 303 and an associated network access layer 305, to allow system 200 to communicate over a network with other systems, such as server system 104 and management system 118. Protocol layer 303 may implement one or more of various higher-level network protocols, such as NFS, CIFS, Hypertext Transfer Protocol (HTTP), TCP/IP and others, as described below.

Network access layer 305 may include one or more drivers, which implement one or more lower-level protocols to communicate over the network, such as Ethernet. Interactions between server systems 104 and mass storage devices 110/212 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level disk storage protocol, such as RAID (redundant array of inexpensive disks), while the storage driver layer 309 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 108.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
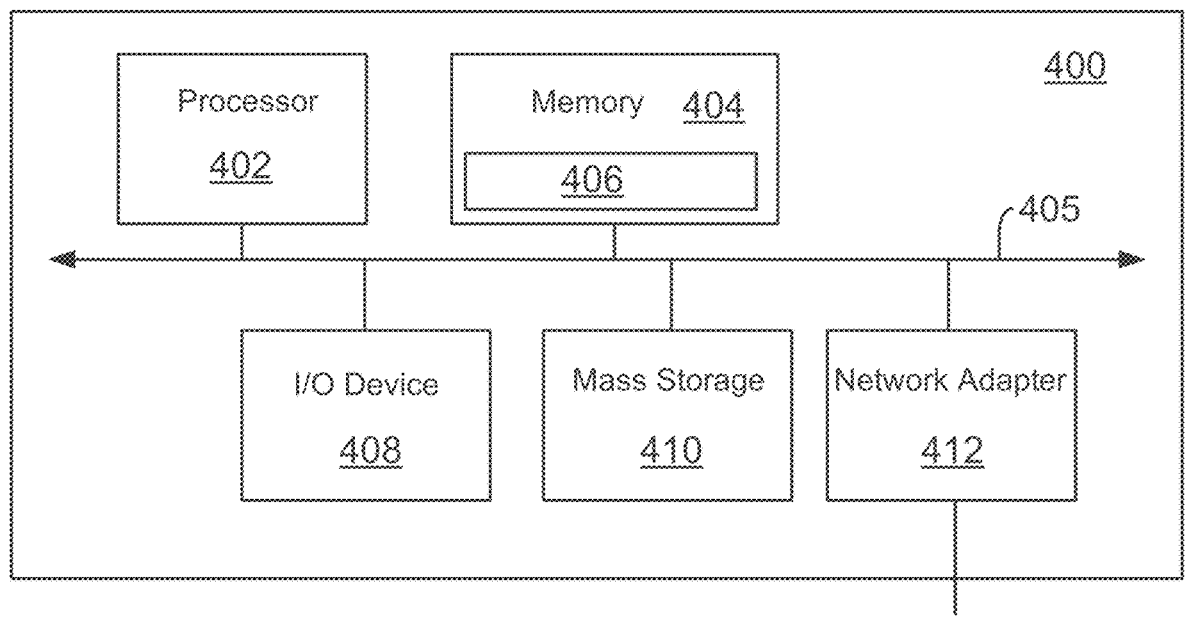
FIG. 4 shows an example of a processing system, used according to one aspect of the present disclosure.

Processing System:

FIG. 4 is a high-level block diagram showing an example of the architecture of a processing system, at a high level, in which executable instructions as described above can be implemented. The processing system 400 can represent modules of management system 118, user console 102, server systems 104 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used by the backup module 138 as well as instructions for executing the process blocks of FIGS. 1F, 1H, 1J and 1L.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The management system 118 (and associated methods thereof) and storage systems described above can be a part of the server layer for providing storage services. Details regarding these layers are not germane to the inventive aspects.

Thus, a method and apparatus for protecting master-less, distributed databases have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method for a distributed, master-less database cluster having a plurality of nodes each executing a database application and storing at least a portion of a database for the cluster, comprising:

capturing a topology of the distributed, master-less database cluster prior to a first phase of a backup operation;

associating token information of each node with a logical storage object of a shared storage system that stores data of the database for each node on behalf of the database application; wherein the token information is based on a hash value of a portion of the data of the database;

generating a snapshot of all logical storage objects associated with each of the plurality of nodes during the first phase;

storing token information of each node with backup metadata for the snapshot of all the logical storage objects during the first phase, where the token information determines what data is stored by each node for the database;

initiating a second phase of the backup operation at a recovery node using the backup metadata from the first phase of the backup operation;

cloning snapshots of all the logical storage objects from the first phase of the backup operation;

flushing information from a commit log for each node to data containers of the database;

creating a new backup logical storage object as a read and write object for storing a cluster consistent backup of the database; and mounting clones of the snapshots of all the logical storage objects from the first phase of the backup operation as read only objects.

2. The method of claim 1, further comprising:
retrieving each node's data directory and renaming data files maintained by each node for storing a portion of the database.

3. The method of claim 2, further comprising:
executing compaction of the data files for the plurality of nodes by eliminating duplicate data for portions of the database.

4. The method of claim 3, further comprising:
generating a snapshot of the backup logical storage object after compaction; and
storing token information for the plurality of nodes.

5. The method of claim 4, further comprising:
deleting clones of the snapshot of the logical storage objects and snapshots of the logical storage objects from the first phase.

6. The method of claim 4, further comprising:
using the snapshot of the backup logical storage object to restore the database at a target cluster with a topology different from a topology of the distributed, master-less database cluster.

7. The method of claim 6, wherein the target cluster topology is same as a topology of the distributed, master-less, database cluster.

8. A non-transitory, machine-readable storage medium having stored thereon instructions for performing a method for a distributed, master-less database cluster having a plurality of nodes each executing a database application and storing at least a portion of a database for the cluster, comprising machine executable code which when executed by at least one machine, causes the machine to:

capture a topology of the distributed, master-less database cluster prior to a first phase of a backup operation;

associate token information of each node with a logical storage object of a shared storage system that stores data of the database for each node on behalf of the database application; wherein the token information is based on a hash value of a portion of the data of the database for each node;

generate a snapshot of all logical storage objects associated with each of the plurality of nodes during the first phase;

store token information of each node with backup metadata for the snapshot of all the logical storage objects, where the token information determines what data is stored by each node for the database during the first phase;

initiate a second phase of the backup operation at a recovery node using the backup metadata from the first phase of the backup operation;

clone snapshots of all the logical storage objects from the first phase of the backup operation;

flush information from a commit log for each node to data containers of the database;

create a new backup logical storage object as a read and write object for storing a cluster consistent backup of the database; and mount clones of the snapshots of all the logical storage objects from the first phase of the backup operation as read only objects.

9. The non-transitory machine-readable storage medium of claim 8, the machine executable code further causing the machine to:
retrieve each node's data directory and renaming data files maintained by each node for storing a portion of the database.

10. The non-transitory machine-readable storage medium of claim 9, the machine executable code further causing the machine to:
execute compaction of the data files for the plurality of nodes by eliminating duplicate data for portions of the database.

11. The non-transitory machine-readable of claim 10, the machine executable code further causing the machine to:
generate a snapshot of the backup logical storage object after compaction; and
store token information for the plurality of nodes.

12. The non-transitory machine-readable of claim 11, the machine executable code further causing the machine to:
delete clones of the snapshot of the logical storage objects and snapshots of the logical storage objects from the first phase.

13. The non-transitory machine-readable of claim 11, the machine executable code further causing the machine to:
use the snapshot of the backup logical storage object to restore the database at a target cluster with a topology different from a topology of the distributed, master-less database cluster.

14. The non-transitory machine-readable of claim 13, wherein the target cluster topology is same as a topology of the distributed, master-less, database cluster.

15. A system, comprising:
a memory containing machine readable medium comprising machine executable code having stored thereon instructions; and a processor coupled to the memory, the processor configured to execute the machine executable code to:

capture a topology of a distributed, master-less database cluster having a plurality of nodes each executing a database application and storing at least a portion of a database for the cluster, prior to a first phase of a backup operation;

associate token information of each node with a logical storage object of a shared storage system that stores data of the database for each node on behalf of the database application; wherein the token information is based on a hash value of a portion of the data of the database for each node;

generate a snapshot of all logical storage objects associated with each of the plurality of nodes during the first phase;

store token information of each node with backup metadata for the snapshot of all the logical storage objects, where the token information determines what data is stored by each node for the database during the first phase;

initiate a second phase of the backup operation at a recovery node using the backup metadata from the first phase of the backup operation;

clone snapshots of all the logical storage objects from the first phase of the backup operation;

flush information from a commit log for each node to data containers of the database;

create a new backup logical storage object as a read and write object for storing a cluster consistent backup of the database; and mount clones of the snapshots of all the logical storage objects from the first phase of the backup operation as read only objects.

16. The system of claim 15, the machine executable code further causing the machine to:

retrieve each node's data directory and renaming data files maintained by each node for storing a portion of the database.

17. The system of claim 16, the machine executable code further causing the machine to:

execute compaction of the data files for the plurality of nodes by eliminating duplicate data for portions of the database.

18. The system of claim 17, the machine executable code further causing the machine to:

generate a snapshot of the backup logical storage object after compaction; and store token information for the plurality of nodes.

19. The system of claim 17, the machine executable code further causing the machine to:

delete clones of the snapshot of the logical storage objects and snapshots of the logical storage objects from the first phase.

20. The system of claim 17, the machine executable code further causing the machine to:

use the snapshot of the backup logical storage object to restore the database at a target cluster with a topology different from a topology of the distributed, master-less database cluster.

* * * * *